United States Patent Office 3,274,147
Patented Sept. 20, 1966

3,274,147
COMPOSITIONS FROM LIQUID CONJUGATED
DIENE POLYMERS
Robert P. Zelinski and Charles W. Strobel, Bartlesville,
Okla., assignors to Phillips Petroleum Company, a corporation of Delaware
No Drawing. Filed May 15, 1961, Ser. No. 109,864
12 Claims. (Cl. 260—41.5)

This invention relates to a method of preparing polymeric products from liquid conjugated diene polymers. In another aspect it relates to an improved method of plasticizing a castable conjugated diene polymer having terminally reactive end groups in order to produce a cured rubbery product having improved low temperature properties. The invention also relates to the product prepared by this method.

The copending application Serial No. 772,167 of Uraneck, Short, and Zelinski, filed November 6, 1958, now U.S. Patent 3,135,716, discloses that highly useful polymeric products can be obtained by polymerizing vinylidene-containing monomers in the presence of an organo alkali metal catalyst and subsequently reacting the resulting polymer containing active alkali metal end groups with a reagent which will replace the alkali metal with more stable reactive end groups. These polymers can then be cured by reacting with polyfunctional organic compounds reactive with the end groups of the polymer. The reactive terminal substituents on the polymer molecules enable more effective cures since all of the polymer molecules can be tied into the crosslinked structure. One of the most outstanding aspects of such a product is that liquid polymers which are readily castable can be converted into rubbery solids. Castable polymers of this type greatly simplify molding operations since the relatively fluid polymer, with or without filler, can be molded into intricate shapes and subsequently cured to form a solid rubbery product. These liquid polymers can be plasticized in order to lower their viscosity to satisfy fabrication requirements or to enable higher amounts of filler to be incorporated into the polymer. It is highly desirable that polymers of this type be developed which, when cured into rubbery products, retain their rubbery characteristics at extremely low temperatures, for example, −40 to −90° F. The physical property most likely to suffer at low temperatures is elongation. The compositions are, therefore, much less resistant to stress and shock.

According to our invention a method is provided for plasticizing a liquid conjugated diene polymer having at least about two terminally reactive groups per molecule in order to improve the processability of polymer during fabrication and yet increase the ability of the cured product to withstand shock and stress at low temperature. We have discovered that if such a liquid polymer is plasticized with a liquid polymer of butadiene having a vinyl content in the range of 0 to 25 percent, a cis content in the range of 30 to 85 percent and a trans content in the range of 0 to 60 percent and reacted with a polyfunctional organic compound, the cured product has substantially improved elongation at very low temperatures. While the liquid polymer can be plasticized with polymers having a microstructure not in specified range to improve processability, we have discovered that improvement in elongation at low temperatures does not result unless the unsaturation of the plasticizing polymer is of the type specified. It is shown, for example, in the data to be presented later, that the use of plasticizing polymers having a microstructure outside the range specified produced an adverse effect on the low temperature elongation of the cured composition. It was quite unexpected, therefore, that a plasticizing polymer could be found which would both improve the processability of the liquid polymer and also the low temperature properties of the solid product.

It is an object of our invention to provide a method of preparing solid rubbery products from liquid conjugated diene polymers. Another object of our invention is to provide a method of plasticizing a liquid conjugated diene polymer having terminally reactive groups in such a manner that the low temperature elongation property of the cured product is improved. Another object is to provide a rubbery product having improved low temperature properties which can be prepared by casting a liquid conjugated diene polymer. Other objects, advantages and features of our invention will be apparent to those skilled in the art from the following disclosure.

The polymers which are plasticized according to our invention are terminally reactive polymers referred to in this specification as "telechelic" polymers. By telechelic polymers we mean polymers of vinylidene-containing monomers which contain a reactive group upon each end of the polymer molecule. Since we are concerned particularly with improving the low temperature elongation properties of such polymers our invention relates to rubbery polymers of this type which can be prepared using a conjugated diene to form either a homopolymer or copolymer with the conjugated diene being in major amount. The conjugated dienes employed ordinarily contain from 4 to 12 carbon atoms per molecule and those containing from 4 to 8 carbon atoms are preferred. Examples of these compounds include 1,3-butadiene, isoprene, 2,3-dimethyl-1,3-butadiene, piperylene, 2-methyl-1,3-hexadiene, phenyl-1,3-butadiene, 1,3-octadiene, 4,5-diethyl-1,3-octadiene, and the like. Conjugated dienes containing halogen and alkoxy substituents along the chain can also be employed such as chloroprene, fluoroprene, 2-methoxy-1,3-butadiene, 2-ethoxy-3-methyl-1,3-hexadiene, and the like. Conjugated dienes can be polymerized alone or in admixture with each other to form copolymers or block copolymers. Block copolymers can be prepared from 2 or more conjugated dienes by charging one compound initially, allowing it to polymerize, and then adding a second conjugated diene and allowing it to polymerize. Conjugated diolefins are preferred and particularly butadiene, isoprene and piperylene.

In addition to homopolymers and copolymers of conjugated dienes, copolymers of conjugated dienes with other monomers containing a $CH_2=C<$ group, such as vinyl-substituted aromatic compounds, can be made by the process of this invention. The vinyl-substituted aromatic compounds include styrene, 1-vinylnaphthalene, 2-vinylnaphthalene, and alkyl, cycloalkyl, aryl, alkaryl, aralkyl, alkoxy, aryloxy, and dialkylamino derivatives thereof in which the total number of carbon atoms in the combined substituents is generally not greater than 12. Examples of these aromatic monomers include 3-methylstyrene (3-vinyltoluene), 4-n-propylstyrene, 4-dodecylstyrene, 4-cyclohexylstyrene, 4-phenylstyrene, 2-ethyl-4-benzylstyrene, 4-p-tolylstyrene, 4-(4-phenyl-n-butyl) styrene, 4-methoxystyrene, 3,5-diphenoxystyrene, 4-dimethylaminostyrene, 4-methoxy-6-di-n-propylaminostyrene, 4,5-dimethyl- 1-vinylnaphthalene, 8-phenyl-1-vinylnaphthalene, 4-methoxy-1-vinylnaphthalene, 3,6-dimethylamino-1-vinylnaphthalene, and the like. Block or random copolymers of conjugated dienes and vinyl-substituted aromatic compounds can be formed. The presence of a small amount of polar compound such as the solvent used in preparing the initiator encourages random copolymerization between conjugated dienes and vinyl-substituted aromatic compounds.

Block copolymers can also be prepared from conjugated dienes and polar monomers which are introduced after the conjugated diene has polymerized. These polar monomers include vinylpyridines and vinylquinolines in which the vinyl group is attached to a ring carbon other than a carbon in the beta position with respect to the nitrogen. These pyridine, quinoline or isoquinoline derivatives can contain substituents such as alkyl, cycloalkyl, aryl, alkaryl, aralkyl, alkoxy, aryloxy and dialkylamino groups in which the total number of carbon atoms in the combined substituents does not exceed 12. Any alkyl groups on the alpha or gamma carbons with respect to the nitrogen should be tertiary alkyl groups. Examples of polar monomers applicable include 2-vinylpyridine, 3,5-diethyl-4-vinylpyridine, 3-n-dodecyl-2-vinylpyridine, 5-cyclohexyl-2-vinylpyridine, 4-phenyl-2-vinylpyridine, 3-benzyl-4-vinylpyridine, 6-methoxy-2-vinylpyridine, 4-phenoxy-2-vinylpyridine, 4-dimethylamino-2-vinylpyridine, 2-vinylquinoline, 3-methyl-4-ethoxy-2-vinylquinoline, 3-vinylisoquinoline, 4-phenyl-1-vinylisoquinoline, and the like.

Other polar monomers include acrylic and alkacrylic acid esters, nitriles, and N,N-disubstituted amides, such as methyl acrylate, ethyl acrylate, butyl acrylate, methyl methacrylate, ethyl methacrylate, propyl methacrylate, butyl methacrylate, methyl ethacrylate, ethyl ethacrylate, isopropyl ethacrylate, acrylonitrile, methacrylonitrile, N,N-dimethylacrylamide, N,N-diethylmethacrylamide and the like. Vinylfuran and N-vinylcarbazole can also be used.

The terminally reactive polymers are prepared by contacting the monomer or monomers which it is desired to polymerize with an organo alkali metal compound. In the preparation of the liquid polymers to be used in our invention the organo metal compounds preferably contain from 2 to 4 alkali metal atoms. As will be explained hereinafter lithium is the preferred alkali metal.

The organo alkali metal compounds can be prepared in several ways, for example, by replacing halogens in an organic halide with alkali metals, by direct addition of alkali metals to a double bond, or by reacting an organic halide with a suitable alkali metal compound. Ordinarily the initiator will be prepared in a polar solvent such as an ether, for example, diethyl ether.

The organo alkali metal compound initiates the polymerization reaction, the organo radical being incorporated in the polymer chain and the alkali metal being attached terminally to each end of the polymer chain. Normally the polymers will be linear having two ends. However, polymers containing more than two ends can be prepared and are within the scope of this invention. These polymers can be represented by the general formula $QM_n$ where Q comprises the polymer as previously described, M is an alkali metal and $n$ is an integer of 2 to 4.

The organo alkali metal initiators employed for preparing the polymers used in our invention can be represented by the formula $RM_x$ where R is a hydrocarbon radical selected from the group consisting of aliphatic, cycloaliphatic and aromatic radicals, M is an alkali metal including sodium, potassium, lithium, cesium and rubidium and $x$ is an integer of 2 to 4. The R in the formula generally contains from 1 to 20 carbon atoms although it is within the scope of the invention to use higher molecular weight compounds. By far the best results are obtained with organolithium compounds which give very high conversions to the terminally reactive polymer. Lithium is, therefore, the preferred alkali metal for the polymerization initiator. Examples of polyalkali metal substituted hydrocarbons which can be employed for the polymerization initiator include 1,4-dilithiobutane,
1,5-dipotassiopentane,
1,4-disodio-2-methylbutane,
1,10-dilithiodecane,
1,20-dilithioeicosane,
1,4-dilithio-2-methyl-2-butene,
1,4-dipotassio-2-butene,
Dilithionaphthalene,
4,4'-dilithiobiphenyl,
Dilithioanthracene,
1,2-dilithio-1,1-diphenylethane,
1,2-dilithio-1,2-diphenylethane,
1,4-dilithiocyclohexane,
1,3,5-trilithiocyclohexane,
1,4-dirubidiobutane,
1,8-dicesiooctane,
1,5-dilithio-3-pentyne,
Dilithiophenanthrene,
1,2-dilithiotriphenylethane,
Dilithiomethane, and the like.

Certain specific initiators give better results than others and are preferred in carrying out preparation of the terminally reactive polymers. Lithium adducts of naphthalene, methylnaphthalenes, and anthracene give very good results. A preferred initiator is 1,2-dilithio-1,2-diphenylethane (lithiumstilbene adduct). Other preferred initiators for the formation of telechelic polymers are the dilithium adducts of 2,3-dialkyl-1,3-butadienes, e.g., 2,3-dimethyl-1,3-butadiene, and especially the dilithium adducts of isoprene and 1,3-butadiene wherein the adduct contains from 1 to 7 diene units per molecule.

The molecular weight of the polymer can be controlled by varying the amount of initiator employed. Liquid polymers having molecular weights in the range of 1,000 to about 20,000 can be prepared in this manner. Usually the initiator is used in the amounts between about 5 and about 100 millimoles per 100 grams of monomer. The molecular weight of the end product can be increased or decreased by decreasing or increasing, respectively, the initiator charge.

The polymerization temperature is normally in the range of −100 to +150° C. preferably between −75 and +75° C. The temperature employed depends upon the monomers and the initiators used in preparing the polymers. For example, organolithium initiators provide more favorable results at elevated temperatures whereas lower temperatures are normally required to effectively initiate polymerization to the desired products with other alkali metal compounds. Preferably the amount of catalyst employed is in the range between about 5 and 30 millimoles per 100 grams of monomers. The polymerization should be carried out in the presence of a suitable diluent which is predominantly hydrocarbon such as benzene, toluene, cyclohexane, methylcyclohexane, xylene, n-butane, n-hexane, n-heptane, isooctane and the like. Generally this diluent is a paraffin, cycloparaffin or aromatic compound containing from 4 to 10 carbon atoms per molecule. Relatively small amounts of other materials can be present such as the ether in which the initiator was dissolved or a polar compound which is charged to encourage random polymerization, as above described.

The terminally reactive polymers prepared as described above contain an alkali metal atom on each end of the polymer chain and the organic radical of the initiator is present in the polymer chain. These terminally reactive polymers are then treated with reagents to introduce various reactive groups in place of the alkali metal atoms. While these alkali metal atoms themselves are reactive they are relatively unstable since in the presence of moisture they are rapidly converted to produce polymers containing an inactive hydrogen in place of the alkali metal. Various reagents can be used to place reactive groups on the ends of the polymer molecule thereby producing stable telechelic polymers which can be conveniently processed and cured at the most opportune time. A wide variety of reactive groups is possible in the telechelic polymers of this type. One of the most practical classes of terminally reactive groups contains reactive hydrogen, for example, hydrogen attached to oxygen, sulfur or nitrogen. Examples of such groups containing reactive hydrogen include:

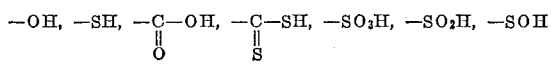

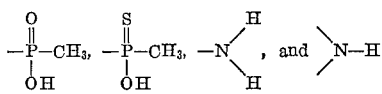

Other such end groups include phosphinic or thionophosphinic acid end groups and other acidic groups such as POOH, SeO$_2$H, SeO$_3$H, SiO$_2$H, SnO$_2$H, SbO$_2$H, SbOH, SbO$_3$H$_2$, TeO$_2$H, TeO$_3$H, AsO$_2$H, AsOH, AsO$_3$H$_2$, and AsO$_3$H$_3$. Examples of other reactive groups are those containing a reactive halogen in which the halogen is attached to carbon or sulfur with the carbon carrying the halogen being singly bonded to oxygen or sulfur, multiply bonded to oxygen or sulfur or alpha to a carbonyl group, a thiono group

an ethenylene group

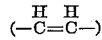

or a carbon group in an aromatic ring. Examples of end groups of this type include:

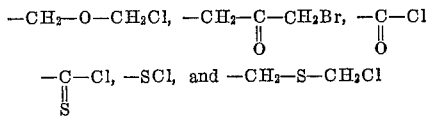

Examples of other reactive end groups are those containing reactive double or triple bonds. For example an oxygen, sulfur or nitrogen attached to carbon by a multiple bond. Examples of these reactive groups include:

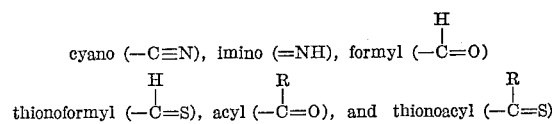

wherein R is a hydrocarbon radical. To summarize the above, the preferred terminal groups can be said to contain at least one reactive element bonding selected from the group consisting of O—H, S—H, N—H, S—X, OC—X, SC—X, RC—X, C=O, C=S and C≡N wherein X is halogen and R is selected from the group consisting of carbonyl, thiono, ethenylene and a carbon in an aromatic ring.

A number of different methods can be used to substitute reactive groups of the above type for the alkali metal atoms on the ends of the polymer chain. For example, the alkali metal telechelic polymer can be reacted with carbon dioxide and thereafter with an acid such as hydrogen chloride to produce a polymer containing terminal carboxy groups. Sulfuryl chloride can be used to produce polymers containing terminal —SO$_2$H groups. Other reactants which can be employed to replace the alkali metal atoms with reactive groups are carbon disulfide, sulfur dioxide, disodium chlororesorcinate, acetone, methylethyl ketone, phenyl methyl ketone, benzyl ethyl ketone, p-tolyl n-propyl ketone, acetyl chloride, propionyl chloride, butyryl bromide, benzoyl chloride, α - cyclohexylacetyl chloride, ethyl acetate, methyl propionate, cyclohexyl butyrate, ethyl benzoate, phenyl acetate, p-tolyl propionate, 2-butenyl acetate, dimethyl formamide, dimethyl acetamide, diethyl benzamide, diphenyl formamide, diethyl 3-cyclohexylpropionamide, methyl chloromethyl ketone, propyl bromoethyl ketone, phenyl chlorophenyl ketone, cyclohexyl bromopropyl ketone, acetonitrile, propionitrile, butyronitrile, 2 - cyclothexylacetonitrile, benzonitrile, p-methylbenzonitrile, ethyl isocyanide, n-butyl isocyanide, n-decyl isocyanide, 2-(4-methylcyclohexyl) ethyl isocyanide, methyl isocyanate, propyl isocyanate, phenyl isocyanate, benzyl isocyanate, p-tolyl isocyanate, n - pentyl isothiocyanate, 2 - hexyl isothiocyanate, butenyl isothiocyanate, xylyl isothiocyanate, benzoquinone, 2-methylbenzoquinone, 4 - bromocyclohexanone, ketene, ethylketene, phenylketene, cyclohexylketene, and the like. Cyclic disulfides can be employed to prepare mercapto telechelic polymers and phosphonic dihalides or thiophosphonic dihalides can be employed to prepare the polymers containing terminal phosphinic or thiophosphinic acid end groups. Epoxy compounds can be employed to prepare polymers containing terminal hydroxy groups, and polymers containing terminal alkali metal atoms can be reacted with compounds containing the structure

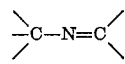

to prepare polymers containing terminal nitrogen groups which are active in quaternizing reactions.

The liquid telechelic polymers which are recovered from these reactions generally have a viscosity in the range of 200 to 5000 poises (at 77° F.). These compounds can be molded by casting either with or without filler and the more fluid of these polymers tolerate substantially larger amounts of filler. It is an advantage of this invention that whatever the initial viscosity of the telechelic polymer to be employed, the polymer can be modified to improve its processability by reducing its viscosity or by permitting substantially larger amounts of filler to be incorporated into the polymer prior to fabrication. By filler we refer to those granular solid materials which are normally used as pigments, fillers, or reinforcing agents in polymeric or rubbery stocks. Most typical of these is carbon black although a wide variety of mineral fillers are frequently employed. Examples of these materials include silica, titanium dioxide, zinc oxide, calcium carbonate, zinc sulfide, calcium silicate, hydrated alumina, calcined magnesia, and various types of clays. Filler loadings can vary over a wide range, for example, between about 20 to 500 parts or higher of filler per 100 parts of the polymer including both the telechelic polymer and its plasticizing agent.

These telechelic polymers prepared as described above can be characterized as containing at least about 2 terminally reactive groups per molecule. While the preponderance of the polymer molecules in the total polymeric composition are polyfunctional, it should be understood that some mono- or nonfunctional molecules can also be present in small amounts. Minute amounts of moisture in the terminating agent will tend to reduce the number of polyfunctional molecules. As an illustration, a polymeric composition in which there is an average of 1.5 to 2.5 functional terminal groups per molecule can be characterized as a telechelic polymer having about 2 terminally reactive groups per molecule.

According to our invention the telechelic polymer is modified for improved processability and/or low temperature elongation of the cured product by incorporating therein substantial amounts of a liquid polymer of butadiene which has a cis content between 30 and 85, preferably between 35 and 85 percent, a trans content between 0 and 60, preferably between 0 and 55 percent, and a vinyl content in the range between 0 and 25, preferably 0 to 15 percent. The amounts of cis, trans and vinyl unsaturation are based upon the total unsaturation in the polymer and are expressed as a percent of this total. The sum of the cis, trans and vinyl contents must equal 100 percent. The microstructure of these polymers can be determined by infra-red analysis, and a suitable procedure is that given for the polymers used in the examples. These polymers of butadiene can be prepared by the procedure described in connection with the telechelic polymers using organolithium initiators although there is no need to replace the terminal lithium atoms with reactive end groups and the polymer can be recovered in the conventional manner by acidifying the polymer solution, for example, with hydrochloric acid and isopropyl alcohol and then washing the polymer until neutral. Organolithium initiators as above described but containing only one lithium atom per molecule can also be used and in fact are frequently preferred for preparing the plasticizer. Examples of these mono-lithium substituted hydrocarbons include methyllithium, n-butyllithium, n-decyllithium, phenyllithium, naphthyllithium, p - tolyllithium, cyclohexyllithium, and the like. Of these n - butyllithium is the preferred initiator. In preparing these plasticizers having a cis, trans and vinyl content in the specified range, polar solvent should be held to a minimum or preferably eliminated altogether from the polymerization mixture. Other methods for preparing the plasticizer having a vinyl content in the specified range can also be used. Although normally the liquid polymer of butadiene is nonfunctional, polymers which contain a functional group can be employed. The examples demonstrate that both mono- and nonfunctional polymers having the required cis, trans, and vinyl content operate quite effectively to improve the low temperature elongation of the cured telechelic polymer. The viscosity of the plasticizer should be in the range of about 10 to 500 poises at 77° F. In the practice of our invention we have found that polymers of butadiene having a viscosity of 20 to 400 poises at 77° F. are most effective in plasticizing the more viscous telechelic polymers having a viscosity of about 500 to 3000 poises at 77° F. The telechelic polymer is normally employed in amounts ranging from 25 to 95 parts by weight per 100 parts of the total polymeric mixture while the liquid polymer of butadiene used as a plasticizer is employed in amounts ranging from 5 to 75 parts per 100 parts of the total polymeric composition. Preferably the invention is practiced with from 70 to 95 parts by weight of the telechelic polymer and from 5 to 30 parts of the liquid polymer of butadiene per 100 parts of the total mixture exclusive of other materials added such as fillers, pigments, auxiliary curatives, antioxidants, or the like.

The telechelic polymer thus plasticized can be mixed with fillers as above mentioned and cured with any curative known to react with the reactive groups on the ends of the polymer molecules. For example, with the polymers containing terminal acidic groups, such as carboxy groups, the curatives found to be most effective are aziridinyl compounds such as triaziridinyl phosphine oxides or sulfides. Any reactive polyfunctional organic compound can be employed as the coupling agent. By "polyfunctional" we mean containing two or more functional groups per molecule. In general, polyfunctional alcohols, acids, halides, amines, ketones, diisocyanates, epoxides and the like, are employed. The organic radicals of the organic polyfunctional compounds are preferably selected from aliphatic, cycloaliphatic or aromatic hydrocarbon radicals containing anywhere from 1 to 36 carbon atoms. Specific examples of coupling agents which can be used include, ethylene glycol, propylene glycol, decylene glycol, dihydroxybenzene, dihydroxycyclohexane, 1,4-di(hydroxyethyl)benzene, glycerol, 1,2,3-trihydroxybutane, erythritol, mannitol, aminophenol, pyrocatechol, resorcinol, pyrogallol, oxalic acid, malonic acid, succinic acid, adipic acid, sebacic acid, pthalic acid (o, m and p), cyclohexane dicarboxylic acid pyridine dicarboxylic acid, naphthalic acid, fumaric acid, the anhydrides of the above listed acids, methylene chloride, 1,2-dibromoethane, 1,4 - dichlorobutane, dibromobenzene, 4 - bromobenzyl bromide, dichlorocyclohexane, 1,4 - dichloronaphthalene, ethylenediamine, pentamethylenediamine, 1,8 - diamino-3 - octene, 1,4 - diaminobenzene, 1,3 - diaminocyclohexane, 4 - aminobenzylamine, 1,4 - diaminonaphthalene, 4-(aminoethyl) aniline, hydroquinone, 1,4-bis(acetyl) butane, 1,5 - bis(propionyl)pentane, 1,4 - bis(acetyl) cyclohexane, alpha, alpha'-bis(acetyl)xylene, butane-1,4-diisocyanate, octane-1,8 - diisocyanate, cyclohexane - 1,4-diisocyanate, benzene-1,4 - diisocyanate, butane-1,4-disulfonic acid, hexane-1,6 - disulfonic acid, decane-1,10-disulfonic acid, cyclohexane-1,4-disulfonic acid, benzene-1,4-disulfonic acid, 1,4 - di(sulfoethyl) - benzene, 2-(3-sulfophenyl)propane sulfonic acid, aliphatic diepoxide resin and the like. Tolylene 2,4 - diisocyanate is a particularly effective coupling agent for hydroxy telechelic polymers. Certain types of the telechelic polymers, particularly those containing terminal mercapto groups, can be reacted with more of the same telechelic polymer of the conjugated diene at elevated temperatures. These polymers are heat curable and the mercapto groups react with the double bonds of the polymer. In this case the polyfunctional organic compound can be considered to be the telechelic polymer itself which contains a reactive functional group on each end of the polymer molecule. Conventional curing agents can be employed as auxiliary curatives, for example, those curatives known to react by cross-linking across the double bonds of the diene polymer. Examples of such conventional curatives include sulfur and sulfur compounds, peroxides, such as benzoyl peroxide, and dicumyl peroxide and the like. Radiation such as ultraviolet or ionizing radiation can also be employed to bring about a curing reaction. The polymers containing the phosphinic acid or thionophosphinic acid end groups represent other examples of polymers which are heat curable by effecting a reaction between a reactive end group of the polymer and a double bond of another polymer molecule. In a preferred aspect of our invention acidic telechelic polymers and most preferably carboxy telechelic polymers which have been plasticized with the liquid polymer of butadiene are cured by coupling reactions with polyaziridinyl compounds. Preferably these compounds contain 3 to 6 aziridinyl groups per molecule although difunctional aziridinyl compounds can also be employed alone or in admixture with the tri- to hexa-functional compounds. Aziridinyl compounds with other degrees of functionality can also be used. The triaziridinyl phosphine oxides or sulfides are typical of compounds used in this type of curing reaction and these are represented by the formula:

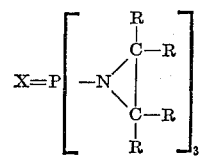

wherein X is selected from the group consisting of oxygen and sulfur, P is phosphorus, and each R is a radical selected from the group consisting of hydrogen, alkyl, cycloalkyl and aryl radicals and composites thereof such as alkaryl, aralkyl and the like and the total R's of each aziridinyl group containing up to a total of 20 carbon atoms. Specific phosphine oxide and sulfide reactants which can be used include:

tri(1-aziridinyl)phosphine oxide,
tri(2-methyl-1-aziridinyl)phosphine oxide,
tri(2,2 - dimethyl - 1 - aziridinyl)phosphine oxide,
tri(2-methyl-3-ethyl-1-aziridinyl)phosphine oxide,
tri(2-ethyl-3-decyl-1-aziridinyl)phosphine oxide,
tri(2-eicosyl-1-aziridinyl)phosphine oxide,
tri(2-methyl-3-cyclopentyl-1-aziridinyl)phosphine oxide,
tri(2-phenyl-1-aziridinyl)phosphine oxide,
tri[2-ethyl-3-(1-naphthyl)1-aziridinyl]phosphine oxide,
tri(2-nonyl-3-benzyl-1-aziridinyl)phosphine oxide,
tri[2-n-propyl-3-(2-phenylethyl)1-aziridinyl]phosphine oxide,
tri[2-heptyl-3-(2,4-dimethylphenyl)1-aziridinyl]phosphine oxide,
tri(2-methyl-1-aziridinyl)phosphine sulfide,
tri(2-methyl-3-cyclohexyl-1-aziridinyl)phosphine sulfide,
tri(2-phenyl-1-aziridinyl)phosphine sulfide, and
tri(2-amyl-3-benzyl-1-aziridinyl)phosphine sulfide.

Examples of other polyfunctional aziridinyl compounds are the aziridinyl-substituted triazines and triphosphatriazines, for example, the 1 - aziridinyl - 1,3,5 - triazines and the 1 - aziridinyl - 2,4,6 - triphospha - 1,3,5 - triazines represented by the formulas:

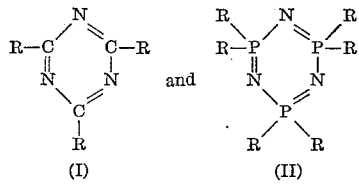

wherein each R is a radical at least two of which in each formula are 1-aziridinyl radicals as defined above for the phosphine oxides and sulfides and the remainder are selected from the group consisting of said 1-aziridinyl radicals, hydrogen, alkyl, cycloalkyl and aryl radicals and composites thereof, each hydrocarbon radical containing from 1 to 12 carbon atoms.

Examples of compounds represented by Formula I include the following:

2,4-di(1-aziridinyl)1,3,5-triazine,
2-methyl-4,6-di(1-aziridinyl)1,3,5-triazine,
2,4,6-tri(1-aziridinyl)1,3,5-triazine,
2,4,6-tri(2-methyl-1-aziridinyl)1,3,5-triazine,
2,4,6-tri(2-methyl-3-ethyl-1-aziridinyl)1,3,5-triazine,
2,4,6-tri(2-ethyl-3-octadecyl-1-aziridinyl)1,3,5-triazine,
2,4,6 - tri(2 - methyl-3-cyclopentyl-1-aziridinyl)1,3,5-triazine,
2,4,6-tri(2-phenyl-1-aziridinyl)1,3,5-triazine,
2,4,6-tri(2,3-diphenyl-1-aziridinyl)1,3,5-triazine,
2,4,6-tri(2-n-propyl-3-(2-phenylethyl)1-aziridinyl)1,3,5-triazine
2,4,6 -tri(2-methyl-3-(4-methylphenyl)-1-aziridinyl)1,3,5-triazine and the like.

Examples of compounds represented by Formula II are:

2,4-di(1-aziridinyl)2,4,6-triphospha-1,3,5-triazine,
2,4,6-tri(1-aziridinyl)2,4,6-triphospha-1,3,5-triazine,
2,4,6-tri(2-methyl-3-n-butyl-1-aziridinyl)2,4,6-triphospha-1,3,5-triazine,
2,4,6-tri(2-ethyl-3-cyclohexyl-1-aziridinyl)2,4,6-triphospha-1,3,5-triazine,
2,4,6-tri[2-n-propyl-3-(2-phenylethyl)1-aziridinyl]2,4,6-triphospha-1,3,5-triazine,
2,4,6 - tri[2 - heptyl-3-(2,4-dimethylphenyl)1-aziridinyl]-2,4,6-triphospha-1,3,5-triazine,
2,2,4,4,6,6 - hexa(2 -methyl-1-aziridinyl)2,4,6-triphospha-1,3,5-triazine, hereinafter referred to as hexa-2-methyl-1-aziridinyl-triphosphatriazine,
2,2,4,6-tetra(2-hexyl-1-aziridinyl)2,4,6-triphospha-1,3,5-triazine and the like.

Other difunctional aziridinyl compounds which can be employed are defined by the formula:

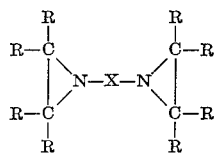

wherein X is selected from the group consisting of carbonyl, phenyl phosphoryl, phenyl thiophosphoryl, sulfoxyl or sulfonyl and each R is as defined above for the aziridinyl radical of the phosphine oxides. In a preferred species X is phenyl phosphoryl or sulfoxyl attached to (2-methyl-1-aziridinyl) groups. Examples of these difunctional aziridinyl compounds are:

phenyl-bis(2-methyl-1-aziridinyl)phosphine sulfide,
phenyl-bis(2-methyl-1-aziridinyl)phosphine oxide,
phenyl-bis(2-ethyl-1-aziridinyl)phosphine oxide,
phenyl-bis(2-methyl-3-ethyl-1-aziridinyl)phosphine oxide,
phenyl-bis(2-butyl-1-aziridinyl)phosphine oxide,
bis(2-methyl-1-aziridinyl)sulfoxide,
bis(2-propyl-1-aziridinyl)sulfoxide,
bis(2-methyl-3-propyl-1-aziridinyl)sulfoxide,
(2-methyl-1-aziridinyl-2-butyl-1-aziridinyl)sulfoxide,
bis(1-aziridinyl)sulfone,
bis(2-methyl-1-aziridinyl)sulfone,
bis(2-ethyl-1-aziridinyl)sulfone,
bis(2-propyl-1-aziridinyl)sulfone,
bis(2-ethyl-3-propyl-1-aziridinyl)sulfone,
(2-methyl-1-aziridinyl-2-ethyl-1-aziridinyl)sulfone,
bis(1,2-propylene)-1,3-urea,
bis(1,2-pentylene)-1,3-urea,
bis(4,5-octylene)-1,3-urea and the like. Other difunctional compounds can be used such as ethylene or diethylene glycol bis(1,2-propylene)carboxamides,
di-1(2-methyl-1-aziridinyl)propanol-2,
bis(1,2-propylene)adipamide,
bis(1,2-propylene)benzene-m-disulfonamide,
bis(1,2-propylene)terephthalamide and the like.

In still another aspect of the invention polymers containing a first functional group Y can be reacted with other polymer containing a second terminal functional group Y' which is reactive with said first functional group. For example, polymers containing terminal carboxy groups can be reacted with polymers containing terminal hydroxy groups. In this embodiment one polymer serves as a difunctional organic coupling agent in tying up the ends of the other polymer chain.

The total amount of polyfunctional curative used can vary considerably but is preferably about stoichiometric to somewhat above stoichiometric, for example, from about 80 percent to about 150 percent or higher of the stoichiometric amount of curative based upon the functional equivalents of the polymer. The reaction of terminally reactive polymers with the polyfunctional compounds can be carried out over a wide range of temperatures generally between about −100 and +500° F. and more usually between about 50 and about 350° F. The time employed will vary from about 5 minutes to 100 hours or longer depending upon the materials being reacted.

A wide variety of products can be produced according to the method of this invention. Compounds, such as potting compounds, caulking compounds, various laminated structures and binders for various types of solids can be made. Since the polymers are liquid and quite fluid in the uncured state, fabrication problems ordinarily attending the manufacture of rubbery products are absent. In order to illustrate the advantages of our invention further the following examples are presented. The proportions and conditions in these examples are given as being typical only and should not be considered as to limit our invention unduly.

Example I

Butadiene was polymerized in accordance with the following recipe:

1,3-butadiene, parts by weight _____ 100
Toluene, parts by weight _____ 1200
Lithium-dimethylbutadiene adduct, mmoles _____ 19.9

Butadiene was dried by passing it through silica gel. Drying of toluene was accomplished with prepurified nitrogen passing countercurrent to the toluene stream in a packed column. The lithium-dimethylbutadiene adduct was prepared in ether and had a concentration of 0.643 molar.

Polymerization was effected in an atmosphere of nitrogen in a stainless steel 20-gallon reactor equipped with a curved-blade turbine operating at 200 r.p.m. The solvent was charged and then the butadiene after which the temperature was adjusted to 122° F., the initiator added, and polymerization effected. Quantitative conversion was reached in an hour.

The batch was cooled to 40° F. and carbonated at blowdown by contacting with excess CO₂ (first passed over activated alumina) in a mixing T. The carbonated solution was acidified with anhydrous HCl in the presence of methyl violet until slightly acid and then filtered through diatomaceous silica. To the filtered solution 0.5 part by weight per 100 parts polymer of the antioxidant, 2,2'-methylene-bis(4-methyl-6 - tert - butylphenol), was added and the solvent was removed under vacuum at 212° F. A 2-hour nitrogen purge was given at the end of the stripping operation. The carbonation time in this run was 15 minutes. Analysis of the product gave the following results:

COOH content, wt. percent _____ 0.74
Viscosity at 77° F., poises _____ 2076
Microstructure, percent:
 Trans _____ 36.6
 Vinyl _____ 35.0

Liquid polybutadiene was prepared in accordance with the following recipe:

| | Parts by weight |
|---|---|
| 1,3-butadiene | 100 |
| Cyclohexane | 780 |
| n-Butyllithium | ¹ 1.28 |
| Time, hours | 3 |
| Temperature, ° F. | 122 |

¹ 20 mmoles.

The unquenched polymer solution was acidified with a mixture of concentrated hydrochloric acid and isopropyl alcohol (proportions of approximately 1:5 parts by volume), the solution was washed with water until neutral and the major portion of the solvent was removed under vacuum with the remainder by purging with nitrogen. The resulting polymer was non-functional and had the following properties:

Viscosity at 77° F., poises _____ 54
Microstructure, percent:
 Trans _____ 58.6
 Vinyl _____ 8

The two liquid polymers were blended using 90.9 parts by weight of the carboxy-containing polymer and 9.1 parts by weight of the liquid polybutadiene. Addition of tri(2-methyl-1-aziridinyl)phosphine oxide (3 parts by weight per 100 parts of the polymer blend) followed by heating 40 minutes at 307° F. gives a product of puttylike consistency which retains its good properties at low temperatures.

*Example II*

The following recipe was employed for the polymerization of butadiene:

| | |
|---|---|
| 1,3-butadiene, parts by weight | 100 |
| Cyclohexane, parts by weight | 780 |
| Lithium-naphthalene-dimethylbutadiene adduct, millimoles | 20 |
| Time, hours | 1.5 |
| Temperature, ° F. | 122 |

Polymerization was effected in an atmosphere of nitrogen as in Example I. The unquenched polymer solution was carbonated using the T-tube technique in a manner similar to that hereinbefore described. After carbonation of the polymer, the reaction mixture was acidified with anhydrous hydrogen chloride, filtered through diatomaceous silica and the solvent removed, the major portion under vacuum and the remainder by purging with nitrogen. Analysis of the product gave the following results:

COOH content, wt. percent _____ 1.02
Viscosity at 77° F., poises _____ 1104
Microstructure, percent:
 Trans _____ 37
 Vinyl _____ 22

This carboxy-containing polymer was blended with liquid polybutadiene prepared as in Example I using the polymers in a weight ratio of 79.9/20.1. Addition of 50 parts by weight of carbon black (Philblack O), 0.5 part of dicumyl peroxide, and 1.0 part of tri(2-methyl-1-aziridinyl)phosphine oxide, each based on 100 parts of polymer blend, gives a material which is free flowing and readily castable. After pouring into a mold and curing 40 minutes at 307° F., a casting which has good low temperature properties, including outstanding elongation values is obtained. A similar casting prepared without the liquid polybutadiene is inferior in these respects.

*Example III*

A carboxy telechelic polymer was prepared having a viscosity of 580 poises at 77° F. The polymerization recipe was as follows:

| | |
|---|---|
| 1,3-butadiene, parts by weight | 100 |
| Cyclohexane, parts by weight | 1000 |
| Lithium-methylnaphthalene-isoprene initiator, millimoles | 20 |
| Temperature, ° F. | 122 |
| Time, hours | 1.5 |
| Conversion | Quantitative |

The initiator had been prepared by reacting isoprene, methylnaphthalene (a commercial mixture of alpha- and beta-methylnaphthalenes), and lithium in ether using the following proportions of ingredients:

| | |
|---|---|
| Methylnaphthalene, grams | ¹14.2 |
| Isoprene, grams | ²6.6 |
| Lithium wire, grams | 2.2 |
| Diethyl ether, ml. | 47.2 |
| Temperature, ° F. | —15 |
| Time, hours | 40 |

¹ 14.2 ml.
² 10.0 ml.

To the reaction mixture was added 4 moles of butadiene per mole of initiator to effect solubilization. The amount of butadiene was calculated from the normality of the reaction mixture which was determined by withdrawing a sample and titrating it with 0.1 N hydrochloric acid.

Immediately following the polymerization the unquenched reaction mixture was carbonated using a T-tube. Carbon dioxide, under a pressure of 15–18 p.s.i.g., and the polymer solution were fed into separate arms of the tube where they were mixed. The carbonated polymer solution was acidified with a hydrochloric acid-isopropyl alcohol mixture and washed with water until neutral. The major portion of the solvent was removed under vacuum and the remainder by purging with nitrogen. The resulting polymer had a carboxy content of 1.25 percent and a vinyl content of 26.2 percent.

Five separate plasticizers, A through E, were prepared as follows:

The polymerization recipe for plasticizers A and B was as follows:

| | |
|---|---|
| 1,3-butadiene, parts by weight | 100 |
| Cyclohexane, parts by weight | 780 |
| n-Butyllithium, millimoles | 40 |
| Temperature, ° F. | 122 |
| Time, hours | 4 |
| Conversion | Quantitative |

Two runs were made. The first designated as plasticizer A was not carbonated. The unquenched reaction mixture was treated with a hydrochloric acid-isopropyl alcohol mixture, washed with water until neutral, and the solvent removed as described for the above carboxy-telechelic polymer.

The polymer from the second run, designated as plasticizer B was carbonated and the polymer recovered as described above.

The polymerization recipe for plasticizers C and D was as follows:

| | |
|---|---|
| 1,3-butadiene, parts by weight | 100 |
| Cyclohexane, parts by weight | 1000 |
| n-Butyllithium, millimoles | 40 |
| Tetrahydrofuran, parts by weight | 5 |
| Temperature, ° F. | 86 |
| Time, hours | 1.5 |
| Conversion | Quantitative |

Two runs were made as before and the polymer from the second run was carbonated as hereinbefore described to form plasticizer D. Both products were recovered as described above.

The polymerization recipe for plasticizer E was as follows:

| | |
|---|---|
| 1,3-butadiene, parts by weight | 100 |
| Toluene, parts by weight | 800 |
| Preformed initiator, millimoles | 10 |
| Temperature, ° F. | 122 |
| Time, hours | 19 |
| Conversion, percent | 50 |

The preformed initiator was prepared by placing 2.02 grams (15.6 millimoles) of anhydrous nickel chloride ($NiCl_2$) in a dry 7-ounce bottle which was then purged with nitrogen, capped, and 17 ml. of an 0.82 molar solution of triethylaluminum in toluene (14 millimoles) was added. The black slurry which formed was allowed to settle and the supernatant liquid was employed as the initiator, the amount used being based on the aluminum charged.

The polymerization was shortstopped with a hydrochloric acid-isopropyl alcohol mixture and the polymer solution washed three times with water. The solvent was removed over a steam bath under vacuum with a nitrogen ebullator.

Microstructures, carboxy contents, and viscosities (Brookfield viscosity at 77° F.) for the polymers from the foregoing runs were as follows:

| Run | Microstructure, percent | | | Brookfield Visc. at 77° F. | COOH, percent |
|---|---|---|---|---|---|
| | Trans | Cis | Vinyl | | |
| Carboxy-telechelic polymer | 41.5 | 32.3 | 26.2 | 580 | 1.25 |
| Plasticizer A | 50.9 | 42.0 | 7.1 | 14 | |
| Plasticizer B | 53.1 | 39.3 | 7.6 | 30 | 1.28 |
| Plasticizer C | 20.9 | 17.7 | 61.4 | 49 | |
| Plasticizer D | 18.9 | 21.4 | 59.7 | 136 | 1.55 |
| Plasticizer E | 3.5 | 93.8 | 2.7 | 420 | |

Eighty parts by weight of the carboxy-telechelic polymer were blended with twenty parts of the liquid plasticizers. The polymers were blended with 250 phr. finely ground, naturally occurring calcium carbonate and cured for 96 hours at 200° F. with 1.5 equivalents of tri(2-methyl-1-aziridinyl phosphine oxide. The low temperature elongation of each specimen was determined and is shown in Table I. Two of the plasticizers, B and D, were mono-functional, that is, contained carboxy groups on one end of the polymer molecule. Plasticizer B had a carboxy content of 1.28 percent and plasticizer D had a carboxy content of 1.55 percent. Plasticizers A, C and E were non-functional.

TABLE I

| Plasticizer | Cis content | Vinyl content (percent) | Cured Stocks | |
|---|---|---|---|---|
| | | | $V_r$ [1] | Elongation @ −90° F. (percent) |
| None | | | 0.230 | 40 |
| E | 93.8 | 2.7 | 0.186 | 20 |
| A | 42.0 | 7.1 | 0.175 | 50 |
| B | 39.3 | 7.6 | 0.125 | 60 |
| D | 21.4 | 59.7 | 0.125 | 20 |
| C | 17.7 | 61.4 | 0.184 | 30 |

[1] $V_r$ is a function of the degree of cure of the polymer and is the inverse swelling ratio of the polymer in n-heptane using the standard "quick-swell" method, i.e., 3 hours at 60° C. and then 3 hours at 30° C.

The above data show that polybutadiene plasticizers can be used to improve the low temperature properties of carboxy-telechelic polymer when the microstructure of the plasticizer is in the range specified. Furthermore, the plasticizer can be either mono-functional or non-functional.

Microstructures of the polymers in the above examples were determined by the infrared analysis according to the following procedure:

The polymer samples were dissolved in carbon disulfide so as to form a solution having 25 grams polymer per liter of solution. The infrared spectrum of each of the solutions (percent transmission) was then determined in a commercial infrared spectrometer.

The percent of the total unsaturation present as trans 1,4- was calculated according to the following equation and consistent units: $\epsilon = E/tc$, where $\epsilon$ = extinction coefficient (liters-mols$^{-1}$-centimeters$^{-1}$); $E$ = extinction (log $I_0/I$); $t$ = path length (centimeters); and $c$ = concentration (mols double bond/liter). The extinction was determined at the 10.35 micron band and the extinction coefficient was 146 (liters-mols$^{-1}$-centimeters$^{-1}$).

The percent of the total unsaturation present as 1,2- (or vinyl) was calculated according to the above equation, using the 11.0 micron band and an extinction coefficient of 209 (liters-mols$^{-1}$-centimeters$^{-1}$). The cis 1,4-unsaturation was determined by difference.

As will be apparent to those skilled in the art various modifications can be made in our invention without departing from the spirit or scope thereof.

We claim:
1. A method of making a polymeric product which comprises mixing a first polymer of a conjugated diene having 4 to 8 carbon atoms per molecule, said first polymer having a molecular weight in the range of 1000 to 20,000 and at least 2 terminally reactive groups per molecule, said terminal groups containing at least one reactive element bonding selected from the group consisting of O—H, S—H, N—H, S—X, OC—X, SC—X, RC—X, C=O, C=S and C≡N wherein X is halogen and R is selected from the group consisting of carbonyl, thiono, ethenylene and a carbon in an aromatic ring, with a plasticizing amount of a second homopolymer of 1,3-butadiene, said second polymer having a viscosity in the range of about 10 to 500 poises at 77° F. and up to 15 percent of its unsaturation in the vinyl form, up to 55 percent in the trans form, and from 35 to 85 percent of its unsaturation in the cis form, and curing the resulting mixture by reacting said terminally reactive groups of said first polymer with a polyfunctional organic compound selected from the group consisting of alcohols, acids, acid anhydrides, halides, amines, ketones, isocyanates, epoxides and aziridinyl compounds.

2. The method of claim 1 wherein said terminally reactive groups are acidic groups and said polyfunctional organic compound is a polyaziridinyl compound.

3. The method of claim 1 wherein said first and second polymers are mixed with 20 to 500 parts by weight per 100 parts of total polymer of finely divided solids selected from the group consisting of carbon black and mineral filler.

4. The method of claim 1 wherein about 25 to 95 parts by weight of said first polymer are mixed with about 5 to 75 parts of said second polymer.

5. A method of making a polymeric product which comprises mixing about 70 to 95 parts by weight of a first polymer of 1,3-butadiene having a viscosity in the range of about 200 to 5000 poises at 77° F. and containing about 2 terminal carboxy groups per molecule with about 5 to 30 parts of a second homopolymer of 1,3-butadiene having a viscosity in the range of about 20 to 400 poises at 77° F. and having from 0 to 15 percent of its unsaturation in the vinyl form, 0 to 55 percent in the trans form, and 35 to 85 percent in the cis form, and curing the resulting mixture by reacting said first polymer with a polyaziridinyl compound.

6. The method of claim 5 wherein said polyaziridinyl compound is tri(2-methyl-1-aziridinyl)phosphine oxide.

7. The method of claim 5 wherein said first polymer is polybutadiene.

8. The method of claim 5 wherein said first polymer is a copolymer of 1,3-butadiene and styrene and the diene in major amount.

9. A method of making a polymeric product which comprises plasticizing a first liquid conjugated diene polymer having a molecular weight of from 1000 to 20,000 and at least about 2 terminally reactive groups per molecule, said terminal groups containing at least one reactive element bonding selected from the group consisting of O—H, S—H, N—H, S—X, OC—X, SC—X, RC—X, C=O, C=S and C≡N wherein X is halogen and R is selected from the group consisting of carbonyl, thiono, ethenylene and a carbon in an aromatic ring, with a second liquid homopolymer of 1,3-butadiene having a viscosity at 77° F. of about 10 to 500 poises and up to 25 percent of its unsaturation in the vinyl form, up to 60 percent in the trans form, and from 30 to 85 percent of its unsaturation in the cis form, and reacting said first polymer with a polyfunctional organic compound selected from the group consisting of alcohols, acids, acid anhydrides, halides, amines, ketones, isocyanates, epoxides and aziridinyl compounds.

10. A solid rubbery product having improved low temperature properties which comprises the reaction product of a polyfunctional organic compound selected from the group consisting of alcohols, acids, acid anhydrides, halides, amines, ketones, isocyanates, epoxides and aziridinyl compounds with a first liquid polymer of a conjugated diene, said first polymer having a molecular weight of from 1000 to 20,000 and at least about 2 terminal reactive groups per molecule, said terminal groups containing at least one reactive element bonding selected from the group consisting of O—H, S—H, N—H, S—X, OC—X, SC—X, RC—X, C=O, C=S and C≡N wherein X is halogen and R is selected from the group consisting of carbonyl, thiono, ethenylene and a carbon in an aromatic ring, and a plasticizing amount of a second liquid homopolymer of 1,3-butadiene having a viscosity at 77° F. of about 10 to 500 poises and up to 25 percent of its unsaturation in the vinyl form, up to 60 percent in the trans form, and from 30 to 85 percent of its unsaturation in the cis form.

11. A solid rubbery product having improved low temperature properties which comprises the reaction product of a polyfunctional organic compound selected from the group consisting of alcohols, acids, acid anhydrides, halides, amines, ketones, isocyanates, epoxides and aziridinyl compounds with from 70 to 95 parts by weight of a first liquid polymer of a conjugated diene, said first polymer having a molecular weight in the range of 1000 to 20,000 and at least 2 terminal reactive groups per molecule, said terminal groups containing at least one reactive element bonding selected from the group consisting of O—H, S—H, N—H, S—X, OC—X, SC—X, RC—X, C=O, C=S and C≡N wherein X is halogen and R is selected from the group consisting of carbonyl, thiono, ethenylene and a carbon in an aromatic ring, from 5 to 30 parts by weight of a second liquid homopolymer of 1,3-butadiene, said second polymer having a viscosity in the range of about 10 to 500 poises at 77° F. and up to 15 percent of its unsaturation in the vinyl form, up to 55 percent in the trans form, and from 35 to 85 percent of its unsaturation in the cis form, and from 20 to 500 parts by weight per 100 parts of total polymer of finely divided solids selected from the group consisting of carbon black and mineral filler.

12. A solid rubbery product having improved low temperature properties which comprises the reaction product of tri(2-methyl-1-aziridinyl)phosphine oxide with from 70 to 95 parts by weight of a first polymer of 1,3-butadiene having a viscosity in the range of about 200 to 5000 poises at 77° F. and containing about 2 terminal carboxy groups per molecule, and from 5 to 30 parts by weight of a homopolymer of 1,3-butadiene, said homopolymer having a viscosity in the range of about 20 to 400 poises at 77° F. having up to 15 percent of its unsaturation in the vinyl form, up to 55 percent in the trans form, and from 30 to 85 percent of its unsaturation in the cis form.

References Cited by the Examiner

UNITED STATES PATENTS

| | | | |
|---|---|---|---|
| 2,146,447 | 2/1939 | Scott | 260—93.5 |
| 2,521,361 | 9/1950 | Gessler | 260—33.6 |
| 2,631,175 | 3/1953 | Crouch | 260—33.6 |
| 3,638,460 | 5/1953 | Crouch | 260—33.6 |
| 2,647,146 | 7/1953 | Arthur | 260—78 |
| 2,877,212 | 3/1959 | Seligman | 260—77.5 |
| 2,891,877 | 6/1959 | Chance et al. | 117—136 |
| 3,004,005 | 10/1961 | Malz et al. | 260—41.5 |
| 3,097,193 | 7/1963 | Gruver | 260—94.9 |

FOREIGN PATENTS 491,995  4/1953  Canada.

OTHER REFERENCES

Chem. Abstracts, 1958, page 21209d.

MORRIS LIEBMAN, *Primary Examiner.*

LEON J. BERCOVITZ, LESLIE H. GASTON,
*Examiners.*

B. S. LEON, K. B. CLARKE, J. S. WALDRON,
*Assistant Examiners.*